Patented Aug. 7, 1928.

1,679,673

UNITED STATES PATENT OFFICE.

ERICH KRAUSE AND KOLOMAN RÓKA, OF CONSTANCE, GERMANY, ASSIGNORS TO THE FIRM OF HOLZVERKOHLUNGS-INDUSTRIE AKTIEN-GESELLSCHAFT, OF CONSTANCE, BADENEA, GERMANY, A CORPORATION OF GERMANY.

MAKING FORMALDEHYDE FROM METHYLENE CHLORIDE.

No Drawing. Application filed October 23, 1924, Serial No. 745,493, and in Austria September 17, 1921.

This application is a continuation in part of our application 585,802 filed September 1, 1922, in which we have claimed a process for making formaldehyde by reacting methylene chloride in presence of water in a closed vessel at higher temperatures. This reaction may be improved by adding to the reaction mixture substances neutralizing the hydrochloric acid formed during the reaction but not acting upon the formaldehyde produced.

By experiments we have however found, that for binding the hydrochloric acid produced during the reaction also such neutralizing substances may be employed, which generally do act upon formaldehyde.

Such substances are for instance strongly alkaline materials such as solutions of alkali-metal hydroxides, ammonia, sodium carbonate and the like. Also lead oxide, which in itself is not strongly alkaline but in reactions of organic chemistry produces the same effects as strongly alkaline substances is adapted for neutralizing the hydrochloric acid produced when making formaldehyde from methylene chloride. The undesirable action of the acid binding substances upon formaldehyde as described above may be avoided according to our invention, if care is taken to maintain the reaction liquid weakly acid or neutral. This can be effected if the acid binding substances are added not all at one time but gradually in the course of the process. The working temperature may be varied according to the special conditions of the reaction but temperatures between 140° and 170° have been found preferable.

When employing ammonia for the neutralization of the hydrochloric acid temperatures below 140° C. for instance temperatures between 120° and 140° C. are sufficient.

Example.

To 10 kg. methylene chloride in an autoclave are gradually added 75 l. of an aqueous solution containing 5% ammonia. The reaction mixture is kept at temperatures of about 130 to 150° C. and stirred during the reaction, until the methylene chloride has disappeared. The obtained solution is weakly acidic and contains formaldehyde, ammonium chloride and a small amount of hydrochloric acid. The formaldehyde is separated in the usual way from the solution.

We claim:

1. A method for making formaldehyde from methylene chloride which consists in heating methylene chloride in the presence of water in a closed vessel to temperatures of about 120 to 170° C. and adding acid-binding materials, which are capable of reacting with formaldehyde, gradually in such quantities, that alkaline reaction of the reaction mixture is avoided.

2. A method for making formaldehyde from methylene chloride which consists in heating methylene chloride in the presence of water in a closed vessel to temperatures of about 120 to 170° C. and adding acid-binding materials, which are capable of reacting with formaldehyde, gradually in such quantities, that the reaction mixture is always maintained weakly acid.

3. A method for making formaldehyde from methylene chloride which consists in heating methylene chloride in the presence of water in a closed vessel to temperatures of about 120 to 170° C. and adding strongly alkaline substances, which are capable of reacting with formaldehyde, gradually in such quantities, that alkaline reaction of the reaction mixture is avoided.

4. A method for making formaldehyde from methylene chloride which consists in heating methylene chloride in the presence of water in a closed vessel to temperatures of about 120 to 170° C. and adding ammonia gradually in such quantities, that alkaline reaction of the reaction mixture is avoided.

In testimony whereof we affix our signatures.

ERICH KRAUSE.
KOLOMAN RÓKA.